US005506063A

United States Patent [19]

Kamijo et al.

[11] Patent Number: 5,506,063

[45] Date of Patent: Apr. 9, 1996

[54] SOFT MAGNETIC FILM OF IRON AND PROCESS OF FORMATION THEREOF

[75] Inventors: Atsushi Kamijo; Hitoshi Igarashi, both of Tokyo, Japan

[73] Assignee: NEC Corporation, Tokyo, Japan

[21] Appl. No.: 207,104

[22] Filed: Mar. 8, 1994

Related U.S. Application Data

[63] Continuation of Ser. No. 767,877, Sep. 30, 1991, abandoned.

[30] Foreign Application Priority Data

Nov. 14, 1990 [JP] Japan .................................... 2-307650
Nov. 16, 1990 [JP] Japan .................................... 2-312038

[51] Int. Cl.[6] ........................................ G11B 5/66

[52] U.S. Cl. ................................ 428/694 T; 428/694 TS; 428/694 ST; 428/694 SG; 428/900

[58] Field of Search ................................ 428/694 T, 900, 428/694 TS, 694 ST, 694 SG

[56] References Cited

U.S. PATENT DOCUMENTS

| | | | |
|---|---|---|---|
| 5,079,219 | 1/1992 | Barnes | 505/171 |
| 5,130,294 | 7/1992 | Char | 505/171 |

OTHER PUBLICATIONS

Koon et al "Direct Evidence for Perpendicular Spin Orientations and Enhanced Hyperfine Fields in Ultrathin Fe(100) Films on Ag(100)"; Phys. Rev. Letters; vol. 59, 21; 23 Nov. 1987.

G. S. Swei, J. B. Lando, S. E. Rickert, K. A. Mauritz, "Epitaxial Processes" in Encyclopedia of Polymer Science and Engineering, 2nd ed., vol. 6, 1986, pp. 209,210.

European Search Report for Application No. EP 91 11 6868.

"Large magnetization induced in single crystalline iron films by high–dose nitrogen implantation", Nakajima et al., Appl. Phys. Lett. 56(1), Jan., 1990, pp. 92–94.

"Checkerboard Domain Patterns on Epitaxially Grown Single–Crystal Thin Films of Iron, Nickel, and Cobalt", Sato et al., Journal of Applied Physics, vol. 34, No. 4 (Part 2), Apr. 1963, pp. 1062–1064.

MBE Growth of Single Crystal Alpha–Fe Films on ZnSe (001) and (110), Journal of Crystal Growth, 1987, vol. 81, pp. 524–529, by B. T. Jonker, et al.

*Primary Examiner*—Leszek Kiliman
*Attorney, Agent, or Firm*—Burns, Doane, Swecker & Mathis

[57] ABSTRACT

A soft magnetic film of single crystalline iron is epitaxially grown on a substrate, and the substrate is formed of single crystalline oxide with a major surface oriented to one of (100) direction, (110) direction and (111) direction so that the iron is never alloyed with the oxide and, accordingly, improved in saturation magnetic properties.

3 Claims, 3 Drawing Sheets

SOFT MAGNETIC FILM OF IRON AND PROCESS OF FORMATION THEREOF

This application is a continuation, of application Ser. No. 07/767,877, filed Sep. 30, 1991 now abandoned.

FIELD OF THE INVENTION

This invention relates to soft magnetic material and, more particularly, to a thin film of iron preferable for a magnetic head of a magnetic recording system.

DESCRIPTION OF THE RELATED ART

High density magnetic recording mediums are available for a magnetic recording system, and the recording density tends to increase. Accordingly, the magnetic head of the recording system is expected to have high saturation magnetic flux density and low coercive force. Soft magnetic materials are large in the saturation magnetic flux density and low in the coercive force, and are preferable for the magnetic head. Thin alloy films in the Ni—Fe system and in the Fe—Al—Si system as well as thin amorphous alloy films in the Co—Nb—Zr system are presently available, and those alloys achieve relatively high saturation magnetic flux density of the order of 1 tesla. However, the alloys are getting close to the limit, and it seems to be hard to further improve the saturation magnetic flux density. A soft magnetic material with the saturation magnetic flux density of about 2 tesla is required, and research and development efforts are now being made on a soft-magnetized iron thin film because of the highest saturation magnetic flux density in the transition metals as large as 2.1 tesla.

In order to improve the soft magnetic properties, it has been proposed to form a thin iron film with a micro crystal grain structure. The micro crystal grain structure is constructed by adding an additive of several per cent into iron or by laminating the thin iron film on an intermediate film. Another approach to improvement of the soft magnetic properties is to epitaxially grow a thin iron film on a small gallium arsenide substrate in a lattice mismatched fashion. Such an epitaxial growth is, by way of example, reported in Journal of Crystal Growth, 1987, vol. 81, page 524.

In general, a thin single crystalline iron film can achieve extremely high saturation magnetic flux density, because no additive is incorporated therein. Moreover, the single crystal is very stable, and is preferable for long service period. For this reason, the thin single crystalline iron film is more preferable than the thin iron films with the micro crystal grain structure. However, when a thin single crystalline iron film is epitaxially grown on a gallium arsenide film, iron is alloyed with gallium arsenide at the interface therebetween, and the saturation magnetic flux density is lowered.

SUMMARY OF THE INVENTION

It is therefore an important object of the present invention to provide a thin single crystalline iron film with a high saturation magnetic flux density which is excellent in soft magnetic properties.

It is also an important object of the present invention to provide a process of forming the thin single crystalline iron film.

To accomplish these objects, the present invention proposes to grow a thin single crystalline iron film on a single crystalline oxide substrate.

In accordance with one aspect of the present invention, there is provided a magnetic film structure comprising a) a substrate formed of single crystalline oxide and having a surface oriented to one of (100) direction, (110) direction and (111) direction, and b) a soft magnetic film formed of single crystalline iron grown over said surface of said substrate.

In accordance with another aspect of the present invention, there is provided a process of forming a magnetic film structure comprising the steps of, a) preparing a substrate formed of single crystalline oxide and having a surface oriented to one of (100) direction, (110) direction and (111) direction, b) creating vacuum ambience with pressure equal to or less than $10^{-8}$ torr around said substrate, and c) epitaxially grown iron on said surface of said substrate by using a source of iron with purity equal to or greater than 99.995 per cent.

BRIEF DESCRIPTION OF THE DRAWINGS

The features and advantages of the soft magnetic film of iron and the process of formation thereof according to the present invention will be more clearly understood from the following description taken in conjunction with the accompanying drawings in which.

DESCRIPTION OF THE PREFERRED EMBODIMENTS

First Embodiment

Figure 1:
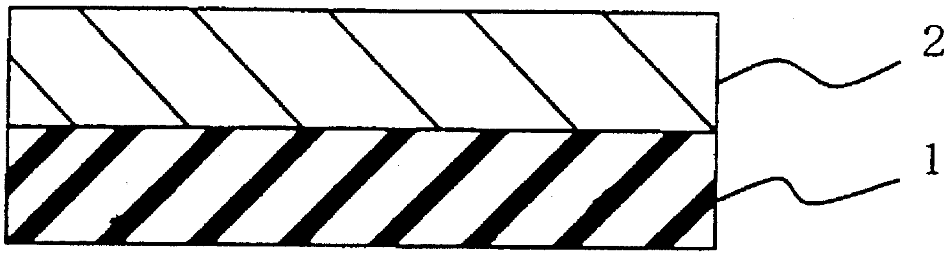
FIG. 1 is a cross sectional view showing the structure of a magnetic film structure according to the present invention.

Referring first to FIG. 1 of the drawings, a soft magnetic film structure embodying the present invention comprises a substrate 1, and a soft magnetic film 2 epitaxially grown on the major (larger) surface of the substrate 1. The substrate 1 is formed of single crystalline magnesium oxide, and the soft magnetic film 2 is of single crystalline iron. The epitaxy is any one of the following orientations.

(1) major surface (001)// iron film (001), major surface [100]// iron film [110]
(2) major surface (110)// iron film (110), major surface [001]// iron film [110]
(3) major surface (111)// iron film (111), major surface [110]// iron film [100]

Although gallium arsenide used in the prior art structure reacts with iron at a relatively low temperature, the iron is not alloyed with the magnesium oxide at 650 degrees in centigrade, and, accordingly, the saturation magnetic flux density of the single crystalline iron for the soft magnetic film 2 is as large as a bulk body of iron. In other words, the soft magnetic film 2 is improved in soft magnetic properties.

Figure 2:
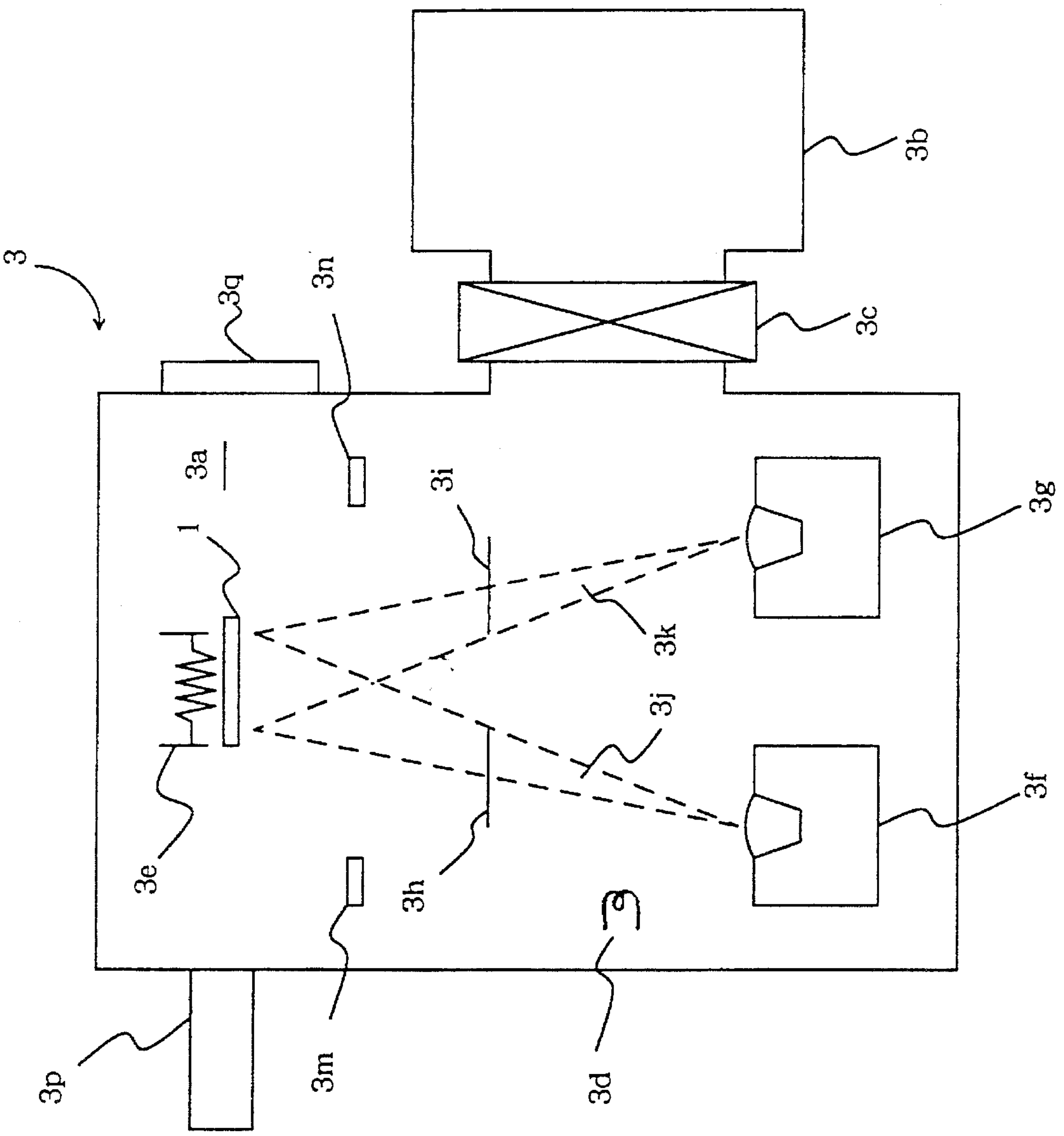
FIG. 2 is a view showing the arrangement of an electron beam evaporating system used for fabricating magnetic film structures according to the present invention.

A process sequence for fabricating the magnetic film structure starts with preparation of the substrate 1 of magnesium oxide and an electron beam evaporating system 3 shown in FIG. 2. The substrate 1 is placed in a vacuum chamber 3a of the electron beam evaporating system 3, and the vacuum chamber 3a is conducted with a cryopump 3b through a gate valve unit *3c*. The cryopump *3b* develops vacuum, and the pressure in the vacuum chamber *3a* is decreased to or exceeds $10^{-8}$ torr. A heating unit (not shown) is provided on the wall defining the vacuum chamber *3a* for developing the extremely high vacuum, and the pressure in the vacuum chamber *3a* is monitored by means of a vacuum gauge *3d*. In this process sequence, the vacuum chamber *3a* is baked at 150 degrees in centigrade for 20 hours for developing the extremely high vacuum equal. However, no baking is carried out for creating a low vacuum ambience.

The substrate 1 is heated by another heating unit *3e*, and the temperature of the substrate 1 is variable. Two electron beam evaporation sources *3f* and *3g* are provided in the vacuum chamber *3a*, and one of the electron beam evaporation sources is filled with iron. Another electron beam evaporation source is used for forming a buffer film incorporated in a magnetic film structure implementing a second embodiment, and will be described hereinafter. The electron beam evaporation sources *3f* and *3g* are spaced apart from the substrate 1, and movable shutter plates *3h* and *3i* are provided on paths *3j* and *3k* between the electron beam evaporation sources *3f* and *3g* and the substrate 1. When the vacuum is well developed and the substrate 1 is heated to the appropriate temperature, one of the movable shutter plates *3h* and *3i* is removed from one of the paths for iron molecular flux, and the major surface of the substrate 1 is exposed to the iron molecular flux. Quartz oscillators *3m* and *3n* are provided in the vicinity of the paths *3j* and *3k*, and one of the quartz oscillators *3m* and *3n* monitors the depositing speed of iron. Upon completion of the deposition, the single crystal iron film is evaluated through reflection high energy electron diffraction with an electron beam *3p* and a phosphor screen *3q*.

After the evaluation of the single crystalline iron film 2, the magnetic film structure is taken out from the vacuum chamber *3a*, and the soft magnetic properties are evaluated at room temperature. A vibrating sample magnetometer is used for measuring the saturation magnetic flux density and the coercive force.

Specimens 1 to 10 are produced through the process sequence described hereinbefore. The substrate 1 is of the magnesium oxide, and the major surface is oriented to (001) direction. The orientation (001) is equivalent to orientations (100) and (010). The purity of iron are varied from 99.9 per cent to 99.999 per cent, and the vacuum is changed between $1\times10^{-7}$ torr and $9\times10^{-10}$ torr. The iron is deposited to about 2000 angstroms on the major surface oriented to (001) direction. The deposition speed is varied from 0.01 angstrom per second to 5 angstroms per second, and the substrate 1 is further changed from 100 degrees to 650 degrees in centigrade. However, the soft magnetic properties are not affected by the deposition speed and the temperature of the substrate 1. Table 1 reports the purity, the vacuum, the epitaxy and the soft magnetic properties of specimens 1 to 10. In Table 1, when the soft magnetic film 2 is epitaxially grown on the substrate 1, the specimen is marked with "*". However, if not, the specimen is marked with "–", and the iron films are polycrystal or of an orientation film.

The reflection high energy electron diffraction results in the epitaxy of (001)Fe//(001)Substrate, [110]Fe//[100]Substrate, and an x-ray diffraction confirms the orientation.

TABLE 1

| Specimen | Purity (%) | Vac. (torr) | Orientation | Epitaxy | Saturation magnetic flux density (tesla) | Coercive force (oersted) |
|---|---|---|---|---|---|---|
| 1 | 99.9 | $8 \times 10^{-10}$ | (100) | — | 1.95 | 18 |
| 2 | 99.99 | $8 \times 10^{-10}$ | (100) | — | 2.00 | 18 |
| 3 | 99.995 | $3 \times 10^{-7}$ | (100) | — | 1.99 | 10 |
| 4 | 99.995 | $1 \times 10^{-8}$ | (100) | * | 2.05 | 1.2 |
| 5 | 99.995 | $5 \times 10^{-9}$ | (100) | * | 2.00 | 1.6 |
| 6 | 99.995 | $8 \times 10^{-10}$ | (100) | * | 2.02 | 1.7 |
| 7 | 99.999 | $1 \times 10^{-7}$ | (100) | — | 1.98 | 12 |
| 8 | 99.999 | $1 \times 10^{-8}$ | (100) | * | 2.10 | 1.2 |
| 9 | 99.999 | $7 \times 10^{-9}$ | (100) | * | 2.08 | 1.3 |
| 10 | 99.999 | $9 \times 10^{-10}$ | (100) | * | 2.05 | 1.4 |

As will be understood from Table 1, the soft magnetic films 2 of the single crystalline iron are epitaxially grown on the respective substrate in the vacuum ambience at or higher than $10^{-8}$ torr by using iron with purity not less than 99.995, and the soft magnetic films 2 have excellent soft magnetic properties. This is because of the fact that the high purity and the extremely high vacuum eliminate undesirable inhibition factor against movement of domain walls from the single crystalline iron films.

Using magnesium oxide substrates with major surfaces oriented to (001) direction, (110) direction and (111) direction, specimens 11 to 28 are produced through the process sequence, and the process parameters are similar to those of the specimens 1 to 10. Table 2 reports the results.

TABLE 2

| Specimen | Purity (%) | Vac. (torr) | Orientation | Epitaxy | Saturation magnetic flux density (tesla) | Coercive force (oersted) |
|---|---|---|---|---|---|---|
| 11 | 99.9 | $3 \times 10^{-6}$ | (100) | — | 1.93 | 20 |
| 12 | 99.9 | $8 \times 10^{-10}$ | (100) | — | 1.95 | 18 |
| 13 | 99.99 | $4 \times 10^{-7}$ | (110) | — | 1.97 | 25 |
| 14 | 99.99 | $8 \times 10^{-10}$ | (100) | — | 2.00 | 18 |
| 15 | 99.995 | $3 \times 10^{-7}$ | (100) | — | 1.99 | 10 |
| 16 | 99.995 | $1 \times 10^{-8}$ | (100) | * | 2.05 | 1.2 |
| 17 | 99.995 | $1 \times 10^{-8}$ | (110) | * | 2.08 | 0.10 |
| 18 | 99.995 | $1 \times 10^{-8}$ | (111) | * | 2.05 | 0.07 |
| 19 | 99.995 | $5 \times 10^{-9}$ | (100) | * | 2.12 | 1.3 |
| 20 | 99.995 | $5 \times 10^{-9}$ | (110) | * | 2.00 | 0.10 |
| 21 | 99.995 | $8 \times 10^{-10}$ | (111) | * | 2.02 | 0.08 |
| 22 | 99.999 | $1 \times 10^{-7}$ | (100) | — | 1.98 | 12 |
| 23 | 99.999 | $1 \times 10^{-8}$ | (100) | * | 2.10 | 1.2 |
| 24 | 99.999 | $1 \times 10^{-8}$ | (110) | * | 2.06 | 0.09 |
| 25 | 99.999 | $1 \times 10^{-8}$ | (111) | * | 2.08 | 0.08 |
| 26 | 99.999 | $7 \times 10^{-9}$ | (100) | * | 2.10 | 1.4 |
| 27 | 99.999 | $7 \times 10^{-9}$ | (110) | * | 2.08 | 0.09 |
| 28 | 99.999 | $9 \times 10^{-10}$ | (111) | * | 2.05 | 0.09 |

The reflection high energy electron diffraction shows the following orientations, and the x-ray diffraction confirms the orientations.

(1) (001)Fe//(001)Substrate, [110]Fe//[100]Substrate (2) (110)Fe//(110)Substrate, [110]Fe//[001]Substrate (3) (111)Fe//(111)Substrate, [100]Fe//[110]Substrate As will be understood from Table 1, the soft magnetic films 2 of the single crystalline iron are epitaxially grown on the respective substrate in the vacuum ambience at or higher than $10^{-8}$ torr by using iron with purity not less than 99.995, and the soft magnetic films 2 have excellent soft magnetic properties. Therefore, the magnetic film structure shown in FIG. 1 is preferable for a magnetic head, and the magnetic head is available for a magnetic recording system for an extremely high density magnetic recording medium. Moreover, Table 2 further teaches us that the substrates 1 with the major surfaces in (110) and (111) directions drastically decrease the coercive force rather than the substrate 1 with the major surface in (100) direction, and are, accordingly, conducive to further improvement of the soft magnetic properties.

Second Embodiment

Figure 3:
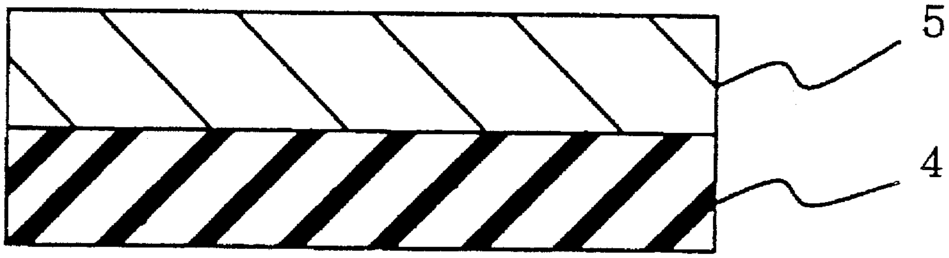
FIG. 3 is a cross sectional view showing the structure of another magnetic film structure according to the present invention.

Turning to FIG. 3 of the drawings, another magnetic film structure embodying the present invention largely comprises a substrate 4 formed of single crystalline strontium titanate, and a soft magnetic film 5 of single crystalline iron epitaxially grown on the major surface of the substrate 4. The epitaxy is any one of the following orientations.

(1) major surface (001)//iron film (001), major surface [100]// iron film [110]

(2) major surface (110)//iron film (110), major surface [001]// iron film [110]

(3) major surface (111)//iron film (111), major surface [110]// iron film [100]

The iron is also not alloyed with the strontium titanate at 650 degrees in centigrade, and, accordingly, the saturation magnetic flux density of the single crystalline iron for the soft magnetic film 2 is as large as a bulk body of iron. In other words, the soft magnetic film 2 is improved in soft magnetic properties.

Using the process sequence applied to the first embodiment, specimens 29 to 46 are produced. The substrates 4 are formed of strontium titanate expressed by the molecular formula of $SrTiO_3$, and the major surfaces are oriented to (001) direction, (110) direction and (111) direction. The results are summarized in Table 3.

The epitaxial soft magnetic films 5 with excellent soft magnetic properties are produced under the vacuum ambience at or higher than $10^{-8}$ torr in so far as the purity is not less than 99.995 per cent. Moreover, the soft magnetic films 5 of the single crystalline iron are epitaxially grown on the respective substrate in the vacuum ambience at or higher than $10^{-8}$ torr by using iron with purity not less than 99.995, and the soft magnetic films 5 have excellent soft magnetic properties. Therefore, the magnetic film structure shown in FIG. 3 is preferable for a magnetic head, and the magnetic head is available for a magnetic recording system for an extremely high density magnetic recording medium.

TABLE 3

| Specimen | Purity (%) | Vac. (torr) | Orientation | Epitaxy | Saturation magnetic flux density (tesla) | Coercive force (oersted) |
|---|---|---|---|---|---|---|
| 29 | 99.9 | $3 \times 10^{-7}$ | (100) | — | 1.92 | 23 |
| 30 | 99.9 | $8 \times 10^{-10}$ | (100) | — | 1.90 | 19 |
| 31 | 99.99 | $4 \times 10^{-7}$ | (110) | — | 1.95 | 22 |
| 32 | 99.99 | $8 \times 10^{-10}$ | (100) | — | 1.99 | 18 |
| 33 | 99.995 | $3 \times 10^{-7}$ | (100) | — | 2.00 | 9 |
| 34 | 99.995 | $1 \times 10^{-8}$ | (100) | * | 2.03 | 1.3 |
| 35 | 99.995 | $1 \times 10^{-8}$ | (110) | * | 2.00 | 0.09 |
| 36 | 99.995 | $1 \times 10^{-8}$ | (111) | * | 2.02 | 0.08 |

TABLE 3-continued

| Specimen | Purity (%) | Vac. (torr) | Orientation | Epitaxy | Saturation magnetic flux density (tesla) | Coercive force (oersted) |
|---|---|---|---|---|---|---|
| 37 | 99.995 | $5 \times 10^{-9}$ | (100) | * | 2.00 | 1.3 |
| 38 | 99.995 | $5 \times 10^{-9}$ | (110) | * | 2.01 | 0.06 |
| 39 | 99.995 | $8 \times 10^{-10}$ | (111) | * | 2.05 | 0.07 |
| 40 | 99.999 | $1 \times 10^{-7}$ | (100) | — | 1.99 | 18 |
| 41 | 99.999 | $1 \times 10^{-8}$ | (100) | * | 2.08 | 1.4 |
| 42 | 99.999 | $1 \times 10^{-8}$ | (110) | * | 2.09 | 0.08 |
| 43 | 99.999 | $1 \times 10^{-8}$ | (111) | * | 2.01 | 0.07 |
| 44 | 99.999 | $3 \times 10^{-9}$ | (100) | * | 2.03 | 1.3 |
| 45 | 99.999 | $3 \times 10^{-9}$ | (110) | * | 2.05 | 0.08 |
| 46 | 99.999 | $7 \times 10^{-10}$ | (111) | * | 2.10 | 0.08 |

Using the iron with purity not less than 99.995 per cent in the vacuum ambience at or higher than $10^{-8}$ torr, the soft magnetic properties are surely improved. Table 3 further teaches us that the substrates 4 with the major surfaces in (110) and (111) directions drastically decrease the coercive force rather than the substrate with the major surface in (100)direction, and are, accordingly, conducive to further improvement of the soft magnetic properties.

Third Embodiment

Figure 4:
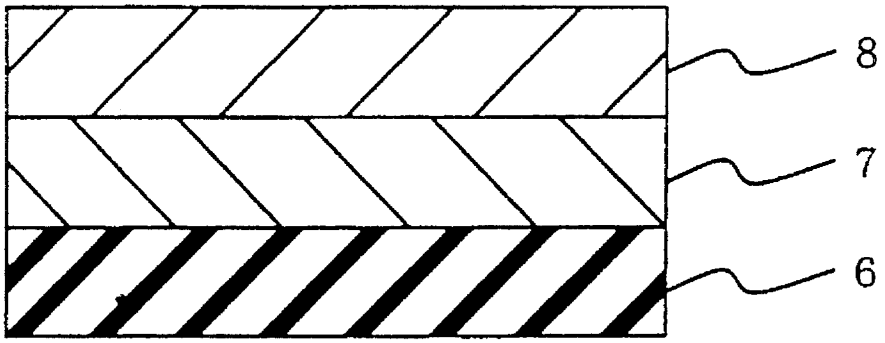
FIG. 4 is a cross sectional view showing the structure of yet another magnetic film structure according to the present invention.

Turning to FIG. 4 of the drawings, yet another magnetic film structure embodying the present invention comprises a substrate 6, a buffer film 7 epitaxially grown on the major surface of the substrate 6, and a soft magnetic film 8 epitaxially grown on the buffer film 7. The substrate 6 is formed of single crystalline magnesium oxide or single crystalline strontium titanate, and the buffer film 7 is formed of single crystalline chromium. The magnetic film 8 is made of single crystalline iron. Although iron is mismatched with magnesium oxide or with strontium titanate at 3.76 per cent or at 3.80 per cent, the buffer film 7 decreases the mismatching rate. In fact, iron is mismatched with chromium at only 0.45 per cent, and, for this reason, the buffer film 7 is effective against the lattice mismatch. The smaller the lattice defect is, the better the soft magnetic properties are. Therefore, if the soft magnetic film 8 is relatively thin, the buffer film 7 is preferable for the soft magnetic properties.

If the substrates 6 with the respective major surfaces in (100), (110) and (111) directions and the buffer films 7 are respectively formed of single crystalline magnesium oxide and chromium, the magnesium oxide and the chromium are fallen into the following relation.

(001)Cr// (001)Substrate, [110]Cr// [100]Substrate
(110)Cr// (110)Substrate, [110]Cr// [001]Substrate
(111)Cr// (111)Substrate, [100]Cr// [110]Substrate The iron are epitaxially grown on the chromium with the crystal faces and the orientations parallel to each other. When strontium titanate substrates 6 are used instead of the magnesium oxide, the above epitaxial relation is also established between the substrates 6 and the buffer films 7.

A process sequence for fabricating the magnetic film structure implementing the third embodiment is similar to that of the first embodiment except for usage of the two electron beam evaporation sources 3*f* and 3*g* shown in FIG. 2. Namely, one of the electron beam evaporation sources 3*f* and 3*g* is filled with high purity iron, and the other electron beam evaporation source is filled with chromium. Specimens 47 to 56 are produced as follows. The chromium is evaporated in the presence of electron beam, and is grown in high vacuum ambience to thickness of about 1000 angstroms on the substrates 6 heated at 350 degrees to 700 degrees in centigrade. The evaporation speed is regulated to 0.05 angstrom per second to 1 angstrom per second. Although the buffer film 7 is grown by using another process such as a sputtering technique, it is desirable to grow the buffer film 7 in a chamber used for epitaxial growth of iron.

After the growth of the buffer films 7 of chromium, the soft magnetic films 8 are epitaxially grown to thickness of about 2000 angstroms on the single crystalline chromium buffer films 7 with the respective major surfaces of (100), (110) and (111) directions. The vacuum ambience and the purity of the iron are changed from $2\times10^{-7}$ torr to $9\times10^{-10}$ and from 99.9 per cent to 99.999 per cent. The evaporation speed is changed from 0.01 angstrom per second to 5 angstroms per second, and the substrate 6 is heated to 100 degrees to 650 degrees in centigrade. However, the soft magnetic properties are not affectable with the evaporation speed and the temperature of the substrate 6.

The epitaxial relation between the single crystalline chromium buffer films 7 and the soft magnetic films 8 of iron is confirmed by using the reflection reflection high energy electron diffraction as well as the x-ray diffraction. The crystal faces and orientations of the single crystalline soft magnetic films 8 of iron are surely in parallel to the crystal faces and orientations of the single crystalline chromium buffer films 7.

TABLE 4

| Specimen | Purity (%) | Vac. (torr) | Orientation | Epitaxy | Saturation magnetic flux density (tesla) | Coercive force (oersted) |
|---|---|---|---|---|---|---|
| 47 | 99.9 | $8\times10^{-10}$ | (100) | — | 1.90 | 20 |
| 48 | 99.99 | $9\times10^{-10}$ | (100) | — | 1.90 | 19 |
| 49 | 99.995 | $3\times10^{-7}$ | (100) | — | 1.93 | 14 |
| 50 | 99.995 | $1\times10^{-8}$ | (100) | * | 1.99 | 1.6 |
| 51 | 99.995 | $5\times10^{-9}$ | (100) | * | 1.98 | 1.7 |
| 52 | 99.995 | $7\times10^{-10}$ | (100) | * | 1.95 | 1.5 |
| 53 | 99.999 | $2\times10^{-7}$ | (100) | — | 1.95 | 10 |
| 54 | 99.999 | $1\times10^{-8}$ | (100) | * | 1.98 | 1.4 |
| 55 | 99.999 | $2\times10^{-9}$ | (100) | * | 1.97 | 1.8 |
| 56 | 99.999 | $8\times10^{-10}$ | (100) | * | 1.95 | 2.0 |

As will be understood from Table 4, the soft magnetic films 8 of the single crystalline iron are epitaxially grown on the respective buffer films 7 in the vacuum ambience at or higher than $10^{-8}$ torr by using iron with purity not less than 99.995, and the soft magnetic films 2 have excellent soft magnetic properties.

Specimens 57 to 74 are fabricated through the same process sequence of the specimens 47 to 56 with the exception that the soft magnetic films 8 are grown to the thickness of about 1800 angstroms.

The epitaxial relation between the single crystalline chromium buffer films 7 and the soft magnetic films 8 of iron is confirmed by using the reflection high energy electron diffraction as well as the x-ray diffraction. The crystal faces and orientations of the single crystalline soft magnetic films 8 of iron are surely in parallel to the crystal faces and orientations of the single crystalline chromium buffer films 7.

TABLE 5

| Specimen | Purity (%) | Vac. (torr) | Orientation | Epitaxy | Saturation magnetic flux density (tesla) | Coercive force (oersted) |
|---|---|---|---|---|---|---|
| 57 | 99.9 | $2\times10^{-7}$ | (100) | — | 1.90 | 28 |
| 58 | 99.9 | $8\times10^{-10}$ | (100) | — | 1.90 | 20 |
| 59 | 99.99 | $4\times10^{-7}$ | (110) | — | 1.92 | 23 |
| 60 | 99.99 | $9\times10^{-10}$ | (100) | — | 1.90 | 19 |
| 61 | 99.995 | $3\times10^{-7}$ | (100) | — | 1.93 | 14 |
| 62 | 99.995 | $1\times10^{-8}$ | (100) | * | 1.99 | 1.6 |
| 63 | 99.995 | $1\times10^{-8}$ | (110) | * | 2.00 | 0.11 |
| 64 | 99.995 | $1\times10^{-8}$ | (111) | * | 1.97 | 0.10 |
| 65 | 99.995 | $5\times10^{-9}$ | (100) | * | 1.93 | 1.7 |
| 66 | 99.995 | $5\times10^{-9}$ | (110) | * | 1.98 | 0.09 |
| 67 | 99.995 | $7\times10^{-10}$ | (111) | * | 1.95 | 0.10 |
| 68 | 99.999 | $2\times10^{-7}$ | (100) | — | 1.95 | 10 |
| 69 | 99.999 | $1\times10^{-8}$ | (100) | * | 1.98 | 1.4 |
| 70 | 99.999 | $1\times10^{-8}$ | (110) | * | 1.97 | 0.10 |
| 71 | 99.999 | $1\times10^{-8}$ | (111) | * | 1.95 | 0.09 |
| 72 | 99.999 | $2\times10^{-9}$ | (100) | * | 1.94 | 1.2 |
| 73 | 99.999 | $2\times10^{-9}$ | (110) | * | 1.97 | 0.08 |
| 74 | 99.999 | $8\times10^{-10}$ | (111) | * | 1.95 | 0.08 |

As will be understood from Table 5, the soft magnetic films 8 of the single crystalline iron are also epitaxially grown on the respective buffer films 7 in the vacuum ambience at or higher than $10^{-8}$ torr by using iron with purity not less than 99.995, and the soft magnetic films 8 have excellent soft magnetic properties. Table 5 further teaches us that the substrates 6 with the major surfaces in (110) and (111) directions drastically decrease the coercive force rather than the substrate with the major surface in (100) direction, and are, accordingly, conducive to further improvement of the soft magnetic properties.

Fourth Embodiment

Figure 5:
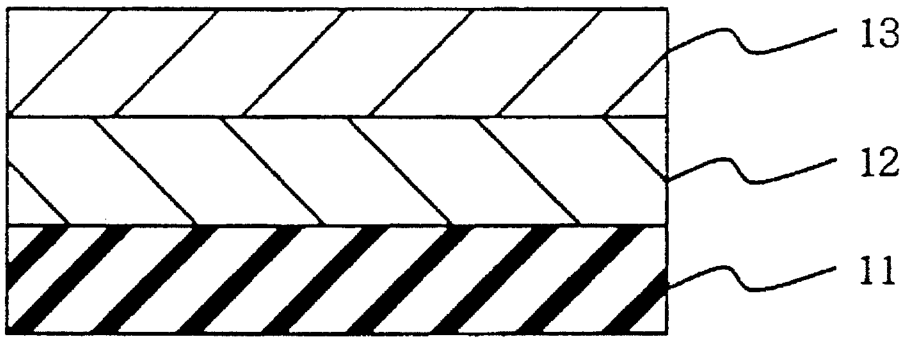
FIG. 5 is a cross sectional view showing the structure of yet another magnetic film structure according to the present invention.

Turning to FIG. 5 of the drawings, yet another magnetic film structure embodying the present invention comprises a substrate 11, a buffer film 12 epitaxially grown on the major surface of the substrate 11, and a soft magnetic film 13 epitaxially grown on the buffer film 12. The substrate 11 is formed of single crystalline magnesium oxide or single crystalline strontium titanate, and the buffer film 12 is formed of single crystalline silver. The major surface of the substrate 11 is oriented to (100) direction, (110) direction or (111) direction, and the magnetic film 13 is made of single crystalline iron. Although silver has a face centered cubic lattice, iron with [110] direction is mismatched with silver with [100] direction at only 0.80 per cent, and the buffer film 12 of silver is also effective against the lattice mismatch, and improves the soft magnetic properties when the soft magnetic film 13 is relatively thin.

If the substrates 11 with the respective major surfaces in (100), (110) and (111) directions and the buffer films 12 are respectively formed of single crystalline magnesium oxide and silver, the magnesium oxide and the silver are fallen into the following relation.

(001)Ag// (001)Substrate, [100]Ag // [100]Substrate
(110)Ag// (110)Substrate, [001]Ag// [001]Substrate
(111)Ag// (111)Substrate, [110]Ag// [110]Substrate When strontium titanate substrates are used instead of the magnesium oxide, the above epitaxial relation is also established between the substrates 11 and the buffer films 12.

A process sequence for fabricating the magnetic film structure implementing the fourth embodiment is similar to that of the first embodiment except for usage of the two electron beam evaporation sources **3*f* and 3*g* shown in FIG. 2. Namely, one of the electron beam evaporation sources 3*f*** and 3g is filled with high purity iron, and the other electron beam evaporation source is filled with silver. The silver is evaporated in the presence of electron beam, and is grown in high vacuum ambience to thickness of about 1000 angstroms on the substrates 11 heated at 100 degrees to 400 degrees in centigrade. The evaporation speed is regulated to 0.1 angstrom per second to 5 angstroms per second. Although the buffer film 12 is grown by using another process such as a sputtering technique, it is desirable to grow the buffer film 12 in a chamber used for epitaxial growth of iron.

After the growth of the buffer films 12 of single crystalline silver in (100), (110) and (111) directions, the soft magnetic films 13 are epitaxially grown to thickness of about 2000 angstroms on the single crystalline silver buffer films 12. The vacuum ambience and the purity of the iron are changed from $2\times10^{-7}$ torr to $9\times10^{-10}$ and from 99.9 per cent to 99.999 per cent. The evaporation speed is changed from 0.01 angstrom per second to 5 angstroms per second, and the substrate 11 is heated to 100 degrees to 650 degrees in centigrade. However, the soft magnetic properties are not affectable with the evaporation speed and the temperature of the substrate 11.

The epitaxial relation between the single crystalline silver buffer films 12 and the soft magnetic films 13 of iron is confirmed by using the reflection high energy electron diffraction as well as the x-ray diffraction as follows.

(001)Fe// (001)Ag, [110]Fe// [100]Ag
(110)Fe// (110)Ag, [110]Fe// [001]Ag
(111)Fe// (111)Ag, [100]Fe// [110]Ag

Specimens 75 to 92 thus produced are reported in Table 6.

TABLE 6

| Specimen | Purity (%) | Vac. (torr) | Orientation | Epitaxy | Saturation magnetic flux density (tesla) | Coercive force (oersted) |
|---|---|---|---|---|---|---|
| 75 | 99.9 | $2 \times 10^{-7}$ | (100) | — | 1.89 | 22 |
| 76 | 99.9 | $9 \times 10^{-10}$ | (100) | — | 1.90 | 19 |
| 77 | 99.99 | $3 \times 10^{-7}$ | (100) | — | 1.90 | 28 |
| 78 | 99.99 | $8 \times 10^{-10}$ | (100) | — | 1.93 | 25 |
| 79 | 99.995 | $3 \times 10^{-7}$ | (100) | — | 1.91 | 14 |
| 80 | 99.995 | $1 \times 10^{-8}$ | (100) | * | 1.99 | 1.3 |
| 81 | 99.995 | $1 \times 10^{-8}$ | (110) | * | 1.96 | 0.10 |
| 82 | 99.995 | $1 \times 10^{-8}$ | (111) | * | 1.95 | 0.08 |
| 83 | 99.995 | $5 \times 10^{-9}$ | (100) | * | 1.96 | 1.4 |
| 84 | 99.995 | $5 \times 10^{-9}$ | (110) | * | 1.95 | 0.09 |
| 85 | 99.995 | $6 \times 10^{-10}$ | (111) | * | 1.98 | 0.10 |
| 86 | 99.999 | $4 \times 10^{-7}$ | (100) | — | 1.97 | 12 |
| 87 | 99.999 | $2 \times 10^{-8}$ | (100) | * | 2.02 | 1.2 |
| 88 | 99.999 | $2 \times 10^{-8}$ | (110) | * | 2.00 | 0.10 |
| 89 | 99.999 | $2 \times 10^{-8}$ | (111) | * | 1.98 | 0.10 |
| 90 | 99.999 | $1 \times 10^{-9}$ | (100) | * | 1.95 | 1.4 |
| 91 | 99.999 | $1 \times 10^{-9}$ | (110) | * | 1.97 | 0.09 |
| 92 | 99.999 | $7 \times 10^{-10}$ | (111) | * | 2.01 | 0.09 |

As will be understood from Table 6, the soft magnetic films 13 of the single crystalline iron are also epitaxially grown on the respective buffer films 12 in the vacuum ambience at or higher than $10^{-8}$ torr by using iron with purity not less than 99.995, and the soft magnetic films 13 have excellent soft magnetic properties. Moreover, Table 6 further teaches us that the substrates 11 with the major surfaces in (110) and (111) directions drastically decrease the coercive force rather than the substrate 11 with the major surface in (100) direction, and are, accordingly, conducive to further improvement of the soft magnetic properties.

Although particular embodiments of the present invention have been shown and described, it will be obvious to those skilled in the art that various changes and modifications may be made without departing from the spirit and scope of the present invention.

What is claimed is:

1. A magnetic film structure comprising a) a substrate formed of a substance selected from the group consisting of single crystalline magnesium oxide having a major surface with an orientation of (110) or (111) and single crystalline strontium titanate having a major surface which is larger than other surfaces with an orientation of (110) and (111), and b) a soft magnetic film formed of single crystalline iron epitaxially grown over said major surface of said substrate in such a manner as to have an upper surface substantially in parallel to said major surface of said substance, said upper surface of said single crystalline iron having an orientation of (110) or (111) when said single crystalline magnesium oxide has said major surface with an orientation of (110) or (111), said upper surface of said single crystalline iron having an orientation of (110) or (111) when said single crystalline strontium titanate has said surface with an orientation of (110) or (111).

2. A magnetic film structure comprising a) a substrate formed of a substance selected from the group consisting of single crystalline magnesium oxide having a major surface with an orientation of (110) or (111) and single crystalline strontium titanate having a major surface which is larger than other surfaces with an orientation of (110) and (111), b) a buffer film epitaxially grown on said major surface of said substrate and having a top surface, and c) a soft magnetic film formed of single crystalline iron epitaxially grown on said surface of said buffer film in such a manner as to have an upper surface substantially in parallel to said major surface of said substrate, said upper surface of said single crystalline iron having an orientation of (110) or (111) when said single crystalline magnesium oxide has said major surface with an orientation of (110) or (111), said upper surface of said single crystalline iron having an orientation of (110) or (111) when said single crystalline strontium titanate has said major surface with an orientation of (110) or (111).

3. A magnetic film structure as set forth in claim 2, in which said buffer film is formed of a substance selected from the group consisting of chromium and silver.

* * * * *